Patented June 6, 1939

2,160,874

UNITED STATES PATENT OFFICE 2,160,874

PROCESS OF REGENERATING A BAUXITE ADSORBENT

Anton Kinsel, Petrolia, Pa., assignor to L. Sonneborn Sons, Inc., a corporation of Delaware No Drawing. Application January 5, 1937, Serial No. 119,080

3 Claims. (Cl. 252—2)

Solid adsorbent materials are used in the petroleum industry to improve the color of petroleum distillates and residua and to effect partial desulphurization of the same. For this purpose the petroleum is brought into contact with the adsorbent material and in general two methods are employed for accomplishing this. In one method the petroleum is admixed with the adsorbent material in a finely divided form and thereafter the mixture is separated by means of a filter press which retains the adsorbent material. This is the practice in the so-called contact process. In another method the adsorbent material is packed into a steel vessel and the oil is caused to percolate through the body of the adsorbent material, from which it issues in a decolorized condition. This is the practice in the so-called percolation process. The term "decolorized" as used in the industry and in this application does not necessarily connote the complete removal of color, but merely implies improvement over the original color. The adsorbent material principally used in the contact process is generally a fine clay, of the fuller's earth type, which has been specially processed to develop its adsorbent characteristics. For example, it may be subjected heat or acid treatment or both. The material principally used in the percolation process is a clay, generally also of the fuller's earth type, but of a fairly coarse state of division, commonly between 25-80 mesh. While bauxite has been used to some extent for this purpose, and may be employed in either the contact or the percolation process, the bauxite as mined is unsuitable, and acquires adsorbent properties only after heat treatment.

After contacting a petroleum oil with bauxite the latter contains the organic materials which it is desirable to remove from the oil by adsorption, together with some of the oil which may be mechanically retained. At this stage, or after the mechanically retained oil has been removed, the bauxite may be regenerated for re-use by suitable treatment which consists in roasting the bauxite at an elevated temperature. This roasting is usually carried out in a furnace of the vertical Wedge or Herreshoff type, or rotary kiln. In the upper part of the furnace the organic matter is carbonized, and reducing conditions may obtain. However, in order to re-activate the material to a maximum degree, it is necessary to completely remove the carbonized residue, for which purpose conditions in the furnace are invariably so adjusted that during the later and final stages of the heat treatment an oxidizing atmosphere is maintained so that when the bauxite is discharged from the furnace, substantially all organic material has been removed by oxidation. This regeneration of the bauxite and subsequent re-use for contacting it with the petroleum oil is carried out repetitiously, although the bauxite in many cases appears to fall off in adsorbent efficiency with progressive regeneration and re-use. I have found that this progressive reduction in efficiency is related at least in part to the iron content of the bauxite, and if the iron content is removed by physical means, the bauxite does not fall off in efficiency to the same extent. Within the broad purview of my invention any means by which the iron may be removed without affecting the iron-free portions of the material, is suitable. I have found, however, that notwithstanding the oxidizing conditions under which the bauxite is regenerated, at least a part of the iron is in a form in which it can be selectively and physically abstracted and removed by magnetic means. In accordance with my process I can effect this removal by the use of any of the commercially available magnetic separators. These are utilized in accordance with the customary methods of separation of paramagnetic material from non-magnetic material. The bauxite with the reduced iron content is passed on for re-use in the treatment of petroleum oils, while the abstracted iron containing material is discarded.

The removal of iron in this manner may be only partial at each step, but by subjecting the bauxite after a majority of the regenerations to the magnetic separation, I am able to reduce the iron content to comparatively low limits and thereby suppress the degradation in efficiency of the bauxite, which would otherwise take place. I prefer, however, to subject the bauxite to the application of the magnetic separator and thereby remove iron containing material after each regeneration. This results in the maximum efficiency and prolongs the useful life of the bauxite.

I claim:

1. The improvement in processes of repetitious regeneration of bauxite comprising at least in one regenerating cycle roasting bauxite containing organic and ferriferous matter and obtained by contacting petroleum oil with a ferriferous bauxite having adsorbent properties, continuing the roasting to substantially combust said organic matter and to convert at least part of said ferriferous matter into para-magnetic matter, at least the final stages of the roasting being carried out in an oxidizing atmosphere so as to substantially remove all carbonize residue formed as the result of the combustion of said organic matter, thereafter removing said para-magnetic matter from the roasted bauxite by magnetic separation and recovering a regenerated bauxite of high adsorbent efficiency.

2. The improvement in processes of repetitious regeneration of bauxite comprising at least in one organic and ferriferous matter and obtained by contacting petroleum oil with a regenerated ferriferous bauxite having adsorbent properties, continuing the roasting to substantially combust said organic matter and to convert at least part of said ferriferous matter into para-magnetic matter, at least the final stages of the roasting being carried out in an oxidizing atmosphere so as to substantially remove all carbonized residue formed as the result of the combustion of said organic matter, thereafter removing said paramagnetic matter from the roasted bauxite by magnetic separation and recovering a regenerated bauxite of high adsorbent efficiency.

3. The improvement in processes of repetitious regeneration of bauxite comprising at least in regenerating cycle roasting bauxite containing one regenerating cycle roasting a bauxite containing organic matter and ferriferous matter including non-magnetic and para-magnetic ferriferous matter and obtained by contacting petroleum oil with a regenerated adsorbent ferriferous bauxite containing non-magnetic and paramagnetic ferriferous matter, continuing the roasting to substantially combust said organic matter and to convert at least part of said non-magnetic into para-magnetic ferriferous matter, at least the final stages of the roasting being carried out in an oxidizing atmosphere so as to substantially remove all carbonized residue formed as the result of the combustion of said organic matter, thereafter removing substantially all of said paramagnetic ferriferous matter from the roasted bauxite by magnetic separation and recovering a regenerated bauxite of high adsorbent efficiency.

ANTON KINSEL.

CERTIFICATE OF CORRECTION.

Patent No. 2,160,874. June 6, 1939.

ANTON KINSEL.

It is hereby certified that error appears in the printed specification of the above numbered patent requiring correction as follows: Page 1, first column, line 27, after "subjected" insert to; page 2, first column, line 2, claim 1, for the word "carbonize" read carbonized; and second column, line 3, claim 3, strike out the words "regenerating cycle roasting bauxite containing" and insert the same before "organic" in first column, line 10, claim 2; and that the said Letters Patent should be read with this correction therein that the same may conform to the record of the case in the Patent Office.

Signed and sealed this 11th day of July, A.D. 1939.

(Seal)

Henry Van Arsdale
Acting Commissioner of Patents.

in an oxidizing atmosphere so as to substantially remove all carbonize residue formed as the result of the combustion of said organic matter, thereafter removing said para-magnetic matter from the roasted bauxite by magnetic separation and recovering a regenerated bauxite of high adsorbent efficiency.

2. The improvement in processes of repetitious regeneration of bauxite comprising at least in one organic and ferriferous matter and obtained by contacting petroleum oil with a regenerated ferriferous bauxite having adsorbent properties, continuing the roasting to substantially combust said organic matter and to convert at least part of said ferriferous matter into para-magnetic matter, at least the final stages of the roasting being carried out in an oxidizing atmosphere so as to substantially remove all carbonized residue formed as the result of the combustion of said organic matter, thereafter removing said para-magnetic matter from the roasted bauxite by magnetic separation and recovering a regenerated bauxite of high adsorbent efficiency.

3. The improvement in processes of repetitious regeneration of bauxite comprising at least in regenerating cycle roasting bauxite containing one regenerating cycle roasting a bauxite containing organic matter and ferriferous matter including non-magnetic and para-magnetic ferriferous matter and obtained by contacting petroleum oil with a regenerated adsorbent ferriferous bauxite containing non-magnetic and para-magnetic ferriferous matter, continuing the roasting to substantially combust said organic matter and to convert at least part of said non-magnetic into para-magnetic ferriferous matter, at least the final stages of the roasting being carried out in an oxidizing atmosphere so as to substantially remove all carbonized residue formed as the result of the combustion of said organic matter, thereafter removing substantially all of said paramagnetic ferriferous matter from the roasted bauxite by magnetic separation and recovering a regenerated bauxite of high adsorbent efficiency.

ANTON KINSEL.

CERTIFICATE OF CORRECTION.

Patent No. 2,160,874.     June 6, 1939.

ANTON KINSEL.

It is hereby certified that error appears in the printed specification of the above numbered patent requiring correction as follows: Page 1, first column, line 27, after "subjected" insert to; page 2, first column, line 2, claim 1, for the word "carbonize" read carbonized; and second column, line 3, claim 3, strike out the words "regenerating cycle roasting bauxite containing" and insert the same before "organic" in first column, line 10, claim 2; and that the said Letters Patent should be read with this correction therein that the same may conform to the record of the case in the Patent Office.

Signed and sealed this 11th day of July, A.D. 1939.

(Seal)

Henry Van Arsdale
Acting Commissioner of Patents.